United States Patent
Yang et al.

(10) Patent No.: US 9,776,534 B2
(45) Date of Patent: Oct. 3, 2017

(54) CAR SAFETY SEAT

(71) Applicant: National Tsing Hua University, Hsinchu (TW)

(72) Inventors: Chien Yang, Taitung County (TW); Te-Hung Chen, Taipei (TW); Mao-Jiun Wang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 70 days.

(21) Appl. No.: 14/886,105

(22) Filed: Oct. 19, 2015

(65) Prior Publication Data

US 2017/0043683 A1   Feb. 16, 2017

(30) Foreign Application Priority Data

Aug. 11, 2015  (TW) .............................. 104126146 A

(51) Int. Cl.
*B60N 2/28* (2006.01)
*B60N 2/26* (2006.01)

(52) U.S. Cl.
CPC .... *B60N 2/2812* (2013.01); *B60N 2002/2818* (2013.01)

(58) Field of Classification Search
USPC ................................. 297/256.15, 484, 250.1
See application file for complete search history.

(56) References Cited

U.S. PATENT DOCUMENTS

| | | | | | |
|---|---|---|---|---|---|
| 4,221,430 | A | * | 9/1980 | Frobose | A47C 7/402 297/353 |
| 4,508,363 | A | * | 4/1985 | Temple | B60R 22/20 280/801.2 |
| 4,550,933 | A | * | 11/1985 | Patterson | B60R 22/20 280/801.2 |
| 4,556,255 | A | * | 12/1985 | Kawai | B60R 22/203 280/801.2 |

(Continued)

FOREIGN PATENT DOCUMENTS

| CN | 2630034 | 8/2004 |
|---|---|---|
| TW | 573636 | 1/2004 |

(Continued)

OTHER PUBLICATIONS

"Office Action of Taiwan Counterpart Application", dated Jun. 7, 2016, p. 1-p. 6.

*Primary Examiner* — Timothy J. Brindley
*Assistant Examiner* — Kyle Walraed-Sullivan
(74) *Attorney, Agent, or Firm* — Jianq Chyun IP Office

(57) ABSTRACT

A car safety seat includes a seat body, at least one knob and at least one safety belt. The seat body has at least one slot structure. The slot structure includes a plurality of first positioning slots and a plurality of guiding slots. Each of the first positioning slots is connected with another adjacent one of the first positioning slots through one of the guiding slots. The knob is movably disposed on the seat body and has a second positioning slot. The safety belt penetrates through the second positioning slot and the corresponding first positioning slot in sequence. The knob is adapted to rotate to (Continued)

drive the safety belt to enter the corresponding guiding slot, and the knob is adapted to move along the slot structure to drive the safety belt to pass through the guiding slot to arrive another adjacent one of the first positioning slots.

8 Claims, 7 Drawing Sheets

(56) References Cited

U.S. PATENT DOCUMENTS

| | | | | |
|---|---|---|---|---|
| 4,640,550 | A * | 2/1987 | H.ang.kansson | B60R 22/203 280/801.2 |
| 4,818,023 | A * | 4/1989 | Griesemer | B60R 22/202 280/801.2 |
| 4,885,200 | A * | 12/1989 | Perdelwitz, Jr. | B60N 2/2812 297/219.12 |
| 4,895,392 | A * | 1/1990 | Schut | B60R 22/205 280/801.2 |
| 5,044,666 | A * | 9/1991 | Griesemer | B60R 22/202 248/297.31 |
| 5,149,136 | A * | 9/1992 | Maekawa | B60R 22/203 280/801.2 |
| 5,340,198 | A | 8/1994 | Murphy et al. | |
| 5,364,169 | A * | 11/1994 | Collins | B60R 22/3405 297/238 |
| 5,449,223 | A * | 9/1995 | Miculici | B60R 22/20 280/801.2 |
| 5,683,138 | A * | 11/1997 | Ward, Jr. | A44B 11/2557 24/68 SB |
| 5,964,502 | A * | 10/1999 | Stephens | B60N 2/2812 297/250.1 |
| 6,398,302 | B1 * | 6/2002 | Freedman | B60N 2/2812 297/216.11 |
| 6,626,492 | B1 * | 9/2003 | Uno | B60N 2/265 297/113 |
| 6,832,767 | B1 * | 12/2004 | Sandvik | B62B 3/144 280/33.993 |
| 6,846,020 | B2 * | 1/2005 | Xu | B60R 22/20 280/801.1 |
| 7,520,532 | B2 * | 4/2009 | Bell | B60N 2/688 280/801.1 |
| 7,887,067 | B2 * | 2/2011 | Sandvik | B62B 3/144 280/33.991 |
| 8,360,521 | B2 * | 1/2013 | Macliver | B60N 2/2812 297/250.1 |
| 8,678,512 | B2 * | 3/2014 | Wang | A44B 11/2511 297/483 |
| 8,919,889 | B2 * | 12/2014 | Kane | A47D 1/002 297/484 |
| 2002/0167213 | A1 * | 11/2002 | Warner, Jr. | B60N 2/2803 297/483 |
| 2004/0061323 | A1 | 4/2004 | Xu | |
| 2005/0035635 | A1 * | 2/2005 | Hendrikus | B60N 2/2812 297/250.1 |
| 2006/0103229 | A1 * | 5/2006 | Fransen | B60N 2/2812 297/484 |
| 2007/0040428 | A1 * | 2/2007 | Sakumoto | B60N 2/2851 297/250.1 |
| 2008/0258527 | A1 * | 10/2008 | Gower | B60N 2/2812 297/256.15 |
| 2011/0221258 | A1 * | 9/2011 | Chen | B60N 2/2812 297/484 |
| 2012/0242129 | A1 * | 9/2012 | Gaudreau, Jr. | B60N 2/2812 297/256.16 |
| 2013/0015690 | A1 * | 1/2013 | Mendis | B60N 2/2806 297/250.1 |

FOREIGN PATENT DOCUMENTS

| | | |
|---|---|---|
| TW | M243387 | 9/2004 |
| TW | M261395 | 4/2005 |
| TW | M445396 | 1/2013 |
| TW | 201341226 | 10/2013 |

* cited by examiner

CAR SAFETY SEAT

CROSS-REFERENCE TO RELATED APPLICATION

This application claims the priority benefit of Taiwan application serial no. 104126146, filed on Aug. 11, 2015. The entirety of the above-mentioned patent application is hereby incorporated by reference herein and made a part of this specification.

BACKGROUND OF THE INVENTION

Field of the Invention

The invention relates to a seat, and particularly relates to a car safety seat.

Description of Related Art

The safety belt attached on the car seat is mainly designed for the adult body, so that it is unable to provide safety and protection for children, and thus the car safety seat suitable for children is gradually developed. The car safety seat is generally mounted on the backseat of the car so as to provide seats for children, and the car safety seat with the exclusive safety belt position the body of children effectively. In response to the growth of children's body, the height of the safety belt on the backrest of the seat of some of the car safety seats is designed as adjustable.

However, the method of adjustment of the safety belt of the car safety seat is generally comparatively inconvenient. The safety belt needs to be detached from the backrest of the seat first, and then the safety belt is reattached to the backrest of the seat at a different height. Therefore, the user's intention to adjust the safety belt of the car safety seat is decreased, so as to decrease the usage rate of the safety belt and a safety environment for children in a car ride cannot be provided. In addition, the safety belt of the car safety seat cannot be adjusted at the seating portion of the seat, so that the child with bigger buttock and bigger pelvis cannot use the safety belt of the car safety seat comfortably.

SUMMARY OF THE INVENTION

The invention provides a car safety seat, a safety belt of the car safety seat is easily adjusted.

The car safety seat of the invention includes a seat body, at least one knob, and at least one safety belt. The seat body has at least one slot structure. The slot structure includes a plurality of first positioning slots and a plurality of guiding slots. The first positioning slots are arranged with intervals in sequence. Each of the first positioning slots is connected with another adjacent one of the first positioning slots through one of the guiding slots, and each of the guiding slots extends from one of the first positioning slots to another adjacent one of the first positioning slots. The knob is movably disposed on the seat body and has a second positioning slot, wherein the second positioning slot is aligned with any one of the first positioning slots. The safety belt penetrates through the second positioning slot and the corresponding first positioning slot in sequence. The knob is adapted to rotate to drive the safety belt to enter the corresponding guiding slot, and the knob is adapted to move along the slot structure to drive the safety belt to pass through the guiding slot to arrive another adjacent one of the first positioning slots.

In one embodiment of the invention, the safety belt is positioned to the corresponding first positioning slot when the knob rotates to a first state to make an extending direction of the second positioning slot parallel to an extending direction of the corresponding first positioning slot, a part of the safety belt enters the corresponding guiding slot when the knob rotates to a second state to make the extending direction of the second positioning slot perpendicular to the extending direction of the corresponding first positioning slot.

In one embodiment of the invention, the seat body includes a seating portion and a backrest connected to each other, the seating portion is located below the backrest, and at least one slot structure is formed at the backrest.

In one embodiment of the invention, the number of the at least one slot structure is plural, the number of the at least one knob is plural, the number of the at least one safety belt is plural, the safety belts penetrate through the slot structures and the knobs respectively.

In one embodiment of the invention, the seat body includes a seating portion and a backrest connected to each other, the seating portion is located below the backrest, and at least one slot structure is formed at the seating portion.

In one embodiment of the invention, the car safety seat includes a wrap member, wherein the wrap member wraps the safety belt.

In one embodiment of the invention, the seat body has at least one recession, the slot structure is formed inside the recession, the inner wall of the recession has a plurality of limiting portions, the limiting portions are respectively corresponding to the first positioning slots, the knob is adapted to be limited to any one of the first positioning slots by the corresponding limiting portion.

In one embodiment of the invention, the knob has two convex arc surfaces opposite to each other, each of the limiting portion has two concave arc surfaces opposite to each other, the two convex arc surfaces are adapted to lean against the two concave arc surfaces respectively to prevent the knob from moving along the recession, the knob is adapted to rotate so as to make the two convex arc surfaces move away from the two concave arc surfaces.

In one embodiment of the invention, the knob includes a knob body and at least one fastening structure, the fastening structure is disposed on the knob body and adapted to fasten the knob body to the seat body.

In one embodiment of the invention, the seat body has a plurality of engaging holes, the fastening structure includes an engaging latch and an elastic member. The engaging latch is slidably disposed in the knob body. The elastic member is connected between the engaging latch and the knob body, wherein the engaging latch is engaged into any one of the engaging holes via an elastic force of the elastic member to fasten the knob body to the seat body, and the engaging latch is adapted to resist the elastic force of the elastic member and to move away from the engaging hole.

Based on the above, in the car safety seat of the invention, the first positioning slots which are used for positioning the safety belt are connected with each other through the guiding slots, and the safety belt penetrates through the second positioning slot of the knob and the corresponding first positioning slot in sequence, so that the user can drive the safety belt to move to a different first positioning through the guiding slot by simply turning the knob and making the knob move along the slot structure. Accordingly, the user is able to adjust the position of the safety belt quickly and easily without detaching the safety belt from the seat body, so as to increase the user's intention to adjust the safety belt of the car safety seat, and further increase the usage rate of the safety belt to provide a safety environment for the child in a car ride.

In order to make the aforementioned and other features and advantages of the invention more comprehensible, embodiments accompanying figures are described in detail belows.

DESCRIPTION OF THE EMBODIMENTS

Figure 1:
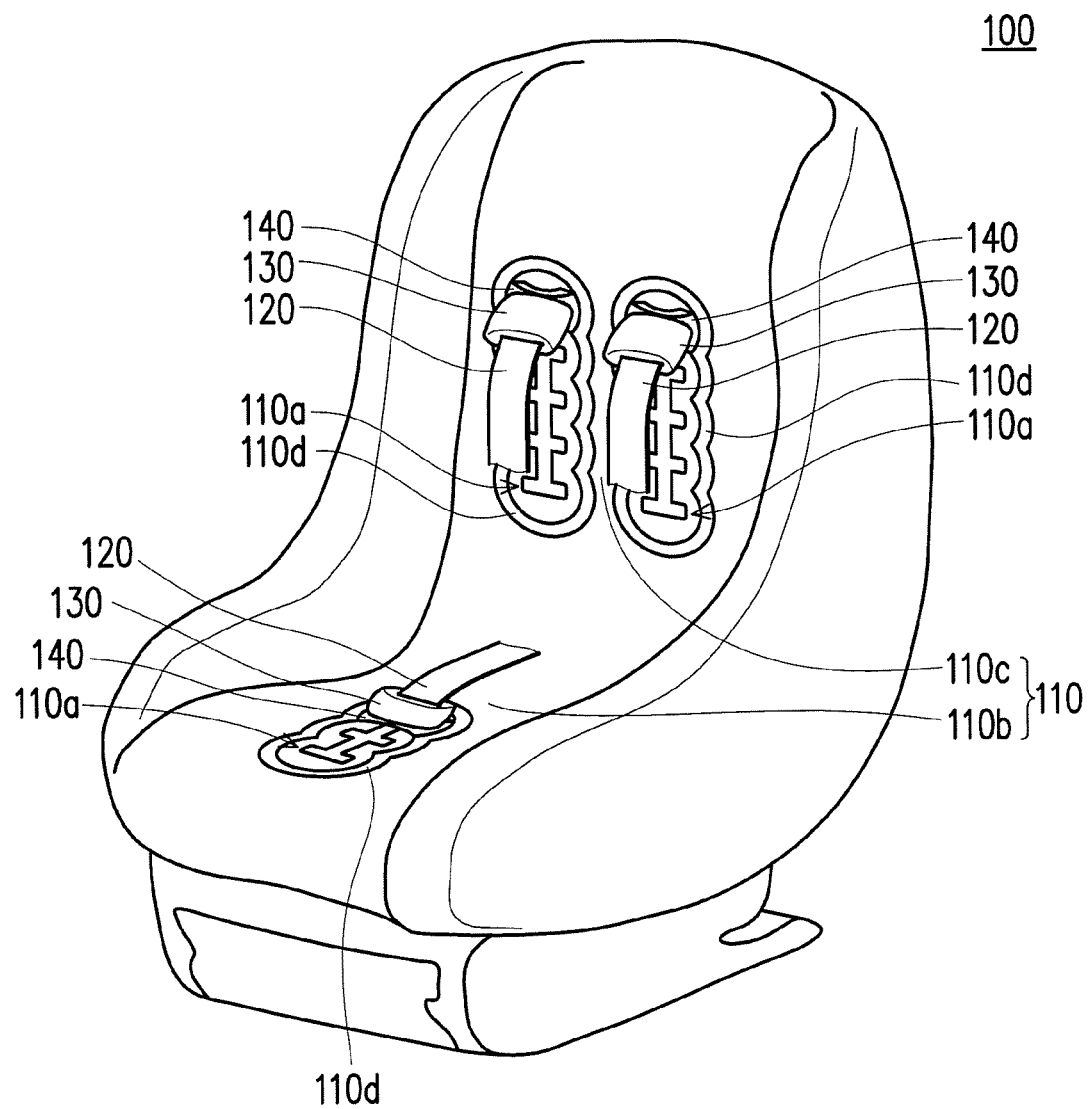
FIG. 1 is a schematic view of a car safety seat of one embodiment of the invention.

FIG. 1 is a schematic view of a car safety seat of one embodiment of the invention. Referring to FIG. 1, the car safety seat 100 of the present embodiment includes a seat body 110 and a plurality of safety belts 120 (depicted as three belts). The seat body 110 can be mounted on the backseat of the car so as to provide a seat for children. The seat body 110 includes a seating portion 110b and a backrest 110c connected to each other, the seating portion 110b is located below the backrest 110c so as to provide a seat for children, and the backrest 110c provides support for children's back. The seat body 110 has a plurality of slot structures 110a (depicted as three slot structures), wherein two slot structures 110a are formed at the backrest 110c, and one slot structure 110a is formed at the seating portion 110b. The safety belts 120 penetrate through the slot structures 110a so as to provide for children to use. In other embodiments, each of the slot structures 110a can also be formed at other appropriate positions of the seat body 110, the invention is not limited thereto.

Figure 2:
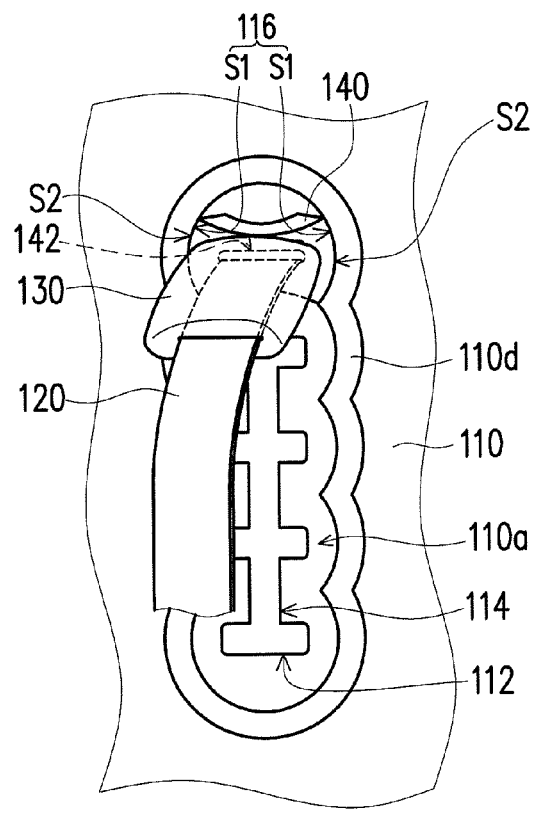
FIG. 2 is a partial schematic view of the car safety seat in FIG. 1.
Figure 3:
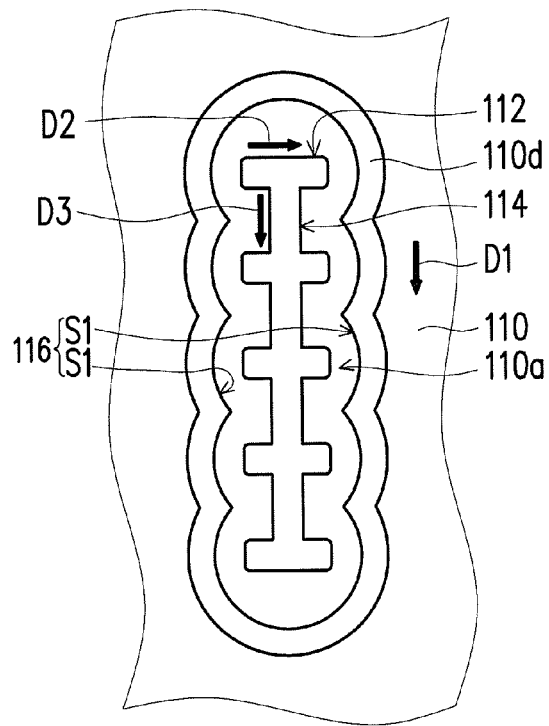
FIG. 3 is a schematic view of part of the components of the car safety seat in FIG. 2.

FIG. 2 is a partial schematic view of the car safety seat in FIG. 1. FIG. 3 is a schematic view of part of the components of the car safety seat in FIG. 2. Referring to FIG. 2 and FIG. 3, each of the slot structures 110a includes a plurality of first positioning slots 112 and a plurality of guiding slots 114, the first positioning slots 112 are a plurality of horizontal slots as shown in FIG. 2 and FIG. 3, and the guiding slots 114 are a plurality of vertical slots as shown in FIG. 2 and FIG. 3. The first positioning slots 112 are arranged with intervals in sequence, each of the first positioning slots 112 is connected with another adjacent one of the first positioning slots 112 through one of the guiding slots 114, and each of the guiding slots 114 extends from one of the first positioning slots 112 to another adjacent one of the first positioning slots 112. Each of the safety belts 120 (as depicted in FIG. 1) can penetrate through one of the first positioning slots 112 of the corresponding slot structure 110a so as to be positioned. In the present embodiment, the first positioning slots 112 are arranged with intervals in sequence along an arranging direction D1 (as depicted in FIG. 3), the arranging direction D1 is, for example, perpendicular to an extending direction D2 (as depicted in FIG. 3) of each of the first positioning slots 112, and an extending direction D3 (as depicted in FIG. 3) of each of the guiding slots 114 is, for example, parallel to the arranging direction D1.

The car safety seat 100 further includes a plurality of knobs 140 (depicted in FIG. 1 as three). The knobs 140 can be movably disposed on the seat body 110 and respectively corresponding to the slot structures 110a. As shown in FIG. 2, each of the knobs 140 has a second positioning slot 142, the second positioning slot 142 following the knob 140 is moved along the corresponding slot structure 110a and aligned with any one of the first positioning slots 112. The safety belt 120 penetrates through the second positioning slot 142 corresponding to the knob 140 and the corresponding first positioning slot 112 in sequence. The knob 140 is adapted to rotate to drive the safety belt 120 to enter the corresponding guiding slot 114, and the knob 140 is adapted to move along the slot structure 110a to drive the safety belt 120 to pass through the guiding slot 114 to arrive another adjacent one of the first positioning slots 112.

Under the above-mentioned disposition method, the first positioning slots 112 which are used for positioning the safety belt 120 are connected with each other through the guiding slots 114, and the safety belt 120 penetrates through the second positioning slot 142 of the knob 140 and the corresponding first positioning slot 112 in sequence, so that the user can drive the safety belt 120 to move to a different first positioning slot 112 through the guiding slot 114 by simply turning the knob 140 and making the knob 140 move along the slot structure 110a. Accordingly, the user is able to adjust the position of the safety belt 120 quickly and easily without detaching the safety belt 120 from the seat body 110, so as to increase the user's intention to adjust the safety belt 120 of the car safety seat 100, and further increase the usage rate of the safety belt 120 to provide a safety environment for children in a car ride. In addition, the structure of the knob 140 is simple and lightweight to be configured at the front side of the seat body 110 and does not need to be configured at the back side of the seat body as the conventional safety belt adjusting mechanism. Therefore, the user can easily and directly operate the knob 140 to adjust the safety belt 120 from the front side of the seat body 110, and there is no need to disassemble the whole car safety seat 100 in order to adjust the safety belt 120 from the back side of the seat body 110.

Referring to FIG. 1 and FIG. 2, in the present embodiment, the car safety seat 100 further includes a plurality of wrap members 130, the wrap members 130 can include a foam pad and respectively wrap the safety belts 120, so as to prevent the safety belts 120 from creating an excessive stress on the shoulder of children. In addition, the slot structure 110a and the knob 140 which are used to adjust the safety belt 120 are not only disposed on the backrest 110c but also disposed on the seating portion 110b of the car safety seat 100 of the present embodiment. Accordingly, the safety belt 120 of the seating portion 110b can also be adjusted, so that the child with bigger buttock and bigger pelvis can use the safety belt 120 of the car safety seat 100 comfortably.

The specific configuration and the actuation means of the knob 140 of the present embodiment is further described as following. Referring to FIG. 1 to FIG. 3, in the present embodiment, the seat body 110 has at least one recession 110d (depicted in FIG. 1 as three), the slot structures 110a are respectively formed inside the recessions 110d. The inner wall of each of the recessions has a plurality of limiting portions 116, each of the limiting portions 116 has two concave arc surfaces S1 opposite to each other, the limiting portions 116 are respectively corresponding to the first positioning slots 112. Each of the knobs 140 has two convex arc surfaces S2 opposite to each other, the two convex arc surfaces S2 are adapted to lean against the two concave arc surfaces S1 respectively to prevent the knob 140 from moving along the recession 110d as shown in FIG. 2. Accordingly, the knob 140 is adapted to be limited to any one of the first positioning slots 112 by the corresponding limiting portion 116, so as to fix the position of the safety belt 120. In the present embodiment, the radius of the curvature of each of the concave arc surface S1 is, for example, the same as the radius of the curvature of the corresponding convex arc surface S2.

Figure 4A:
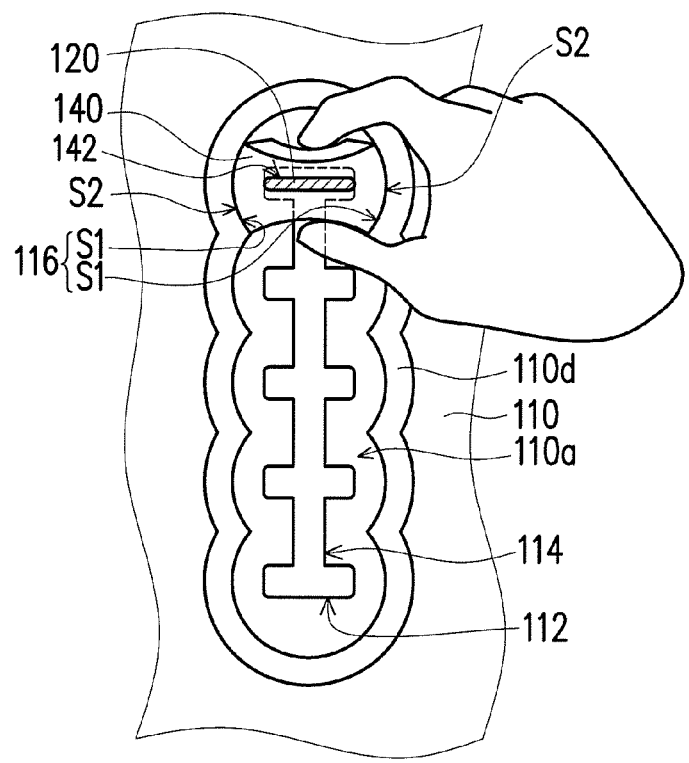
FIG. 4A to FIG. 4D depict a method of adjustment of a safety belt in FIG. 2.
Figure 4B:
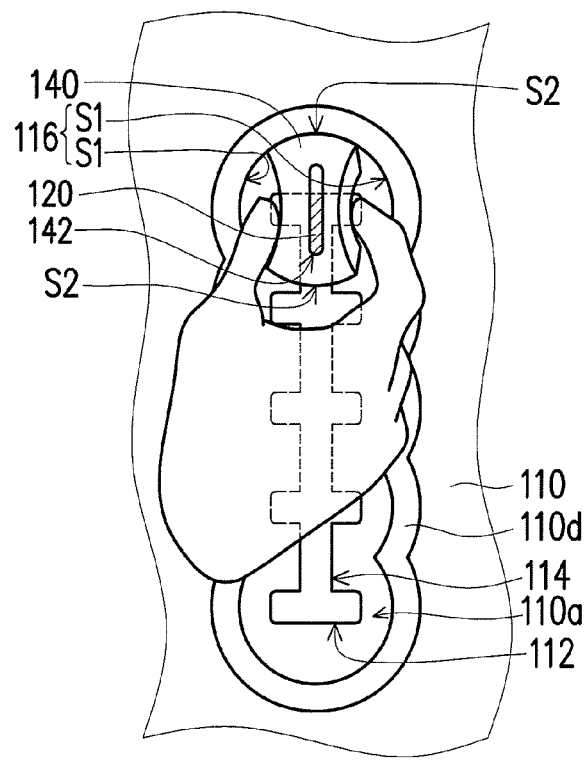

The method of adjustment of the safety belt 120 of the present embodiment is described via drawings as following. FIG. 4A to FIG. 4D depict a method of adjustment of a safety belt in FIG. 2. In order to make the drawings clearer, the safety belt 120 in the FIG. 4A to FIG. 4D is depicted in cross-sectional manner, and the wrap member 130 in FIG. 2 is not shown. When the knob 140 is in a first state as shown in FIG. 4A to make an extending direction of the second positioning slot 142 parallel to an extending direction of the corresponding first positioning slot 112 (the extending direction D2 as shown in FIG. 3), the safety belt 120 is positioned to the corresponding first positioning slot 112. Because of a force applied by the user, the knob 140 is adapted to rotate to a second state as shown in FIG. 4B to make the extending direction of the second positioning slot 142 perpendicular to the extending direction of the corresponding first positioning slot 112, at this time, a part of the safety belt 120 enters the corresponding guiding slot 114, and two convex arc surfaces S2 of the knob 140 move away from two concave arc surfaces S1 of the limiting portion 116 so that the knob 140 is no longer limited by the limiting portion 116 as being unable to move along the recession 110d.

Figure 4C:
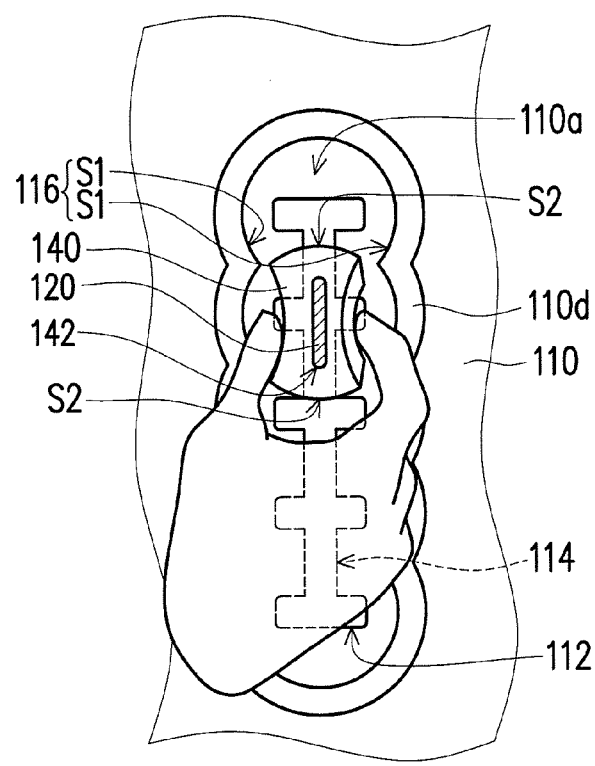
Figure 4D:
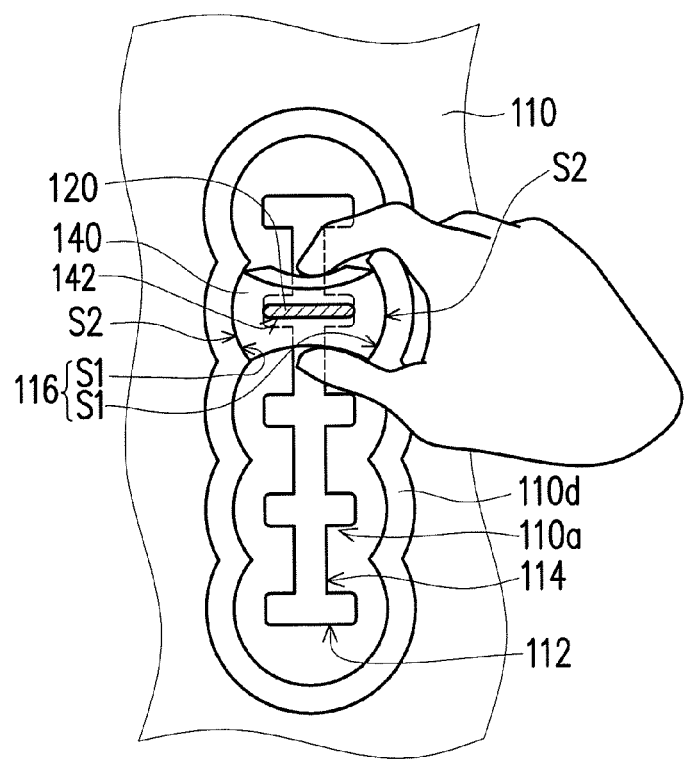

Furthermore, the user pulls the knob 140 downwards as shown in FIG. 4C to make the knob 140 move along the recession 110d to another adjacent one of the first positioning slots 112, in this process, the safety belt 120 is driven downwards by the knob 140. After that, the user can turn the knob 140 to the first state as shown in FIG. 4D to make the extending direction of the second positioning slot 142 parallel to the extending direction of the corresponding first positioning slot 112 again, the safety belt 120 is positioned to the corresponding first positioning slot 112. The user can adjust each of the safety belts 120 to any one of the positioning slots 112 of the corresponding slot structure 110a based on this method.

Figure 5:
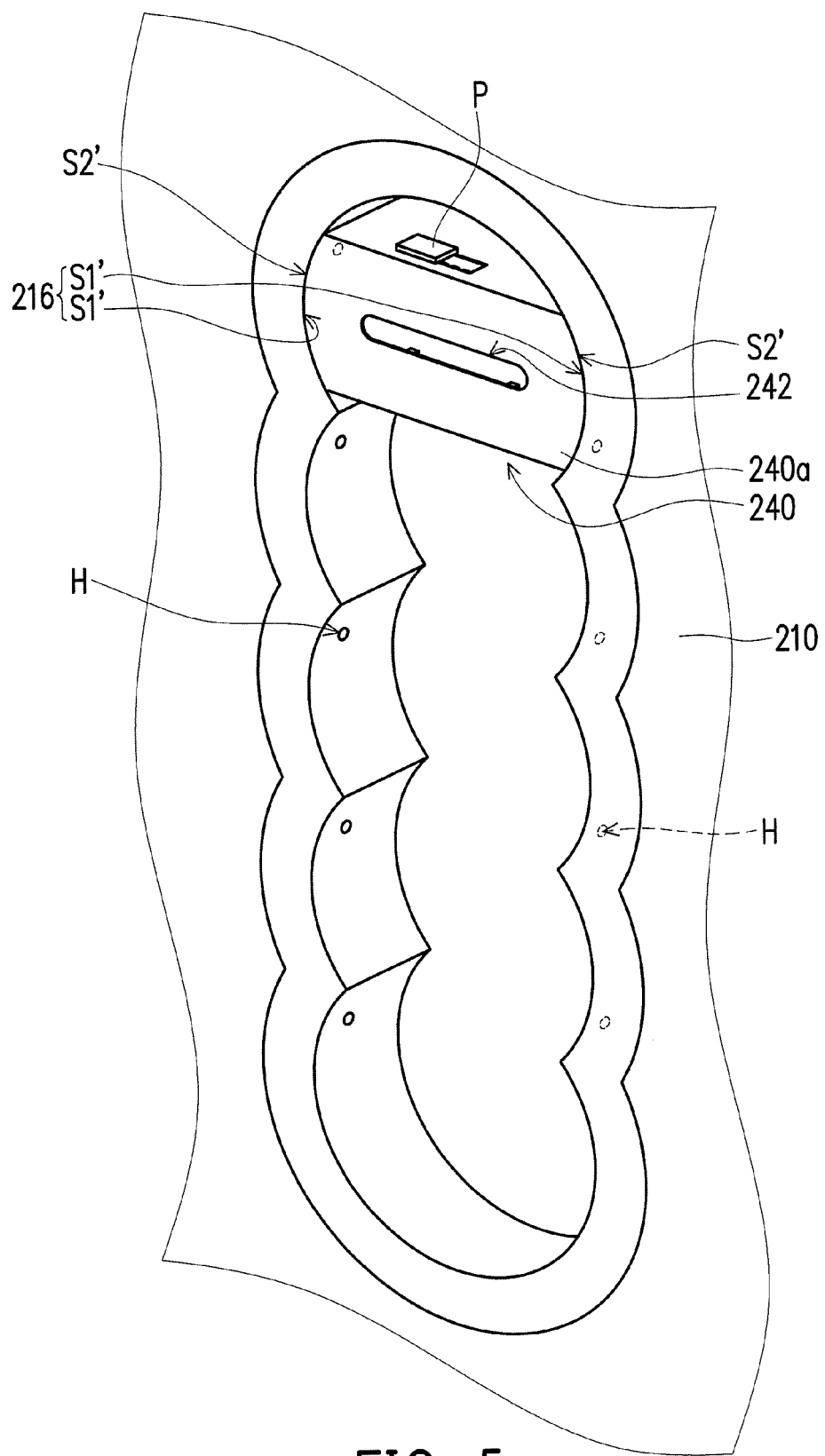
FIG. 5 is a schematic view of part of the components of a car safety seat of one embodiment of the invention.
Figure 6:
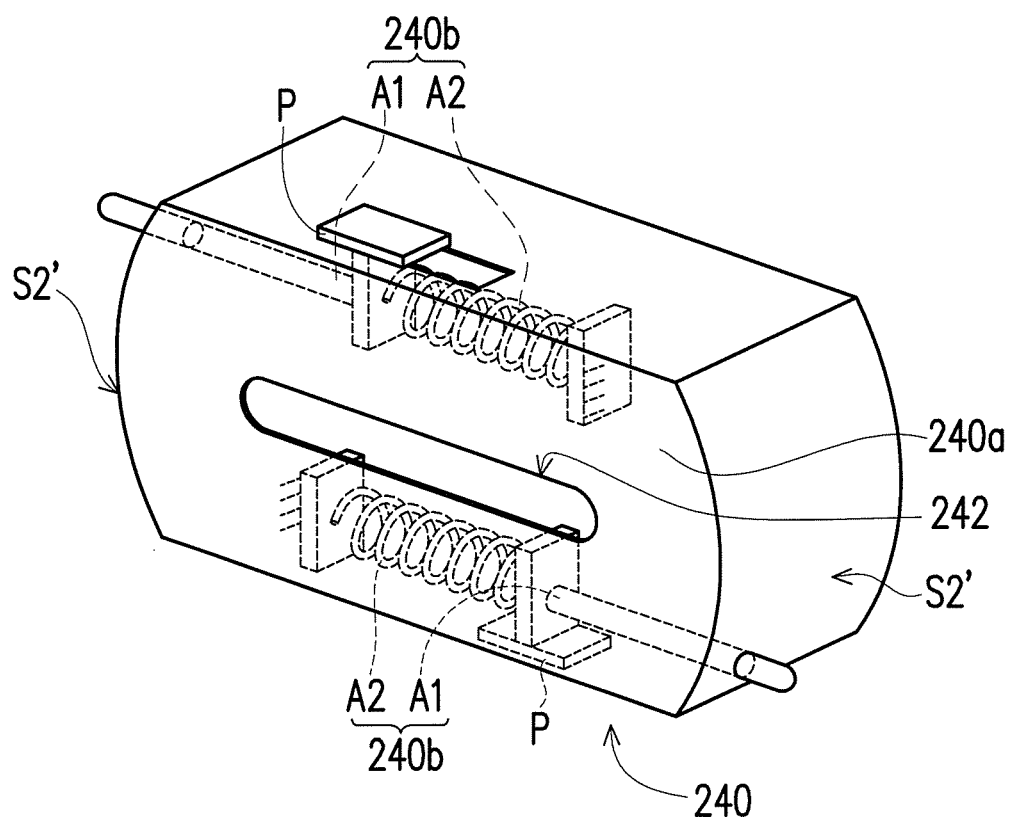
FIG. 6 is a schematic view of a knob in FIG. 5.

In other embodiments, the knob can be fastened to the seat body via the fastening structure, so as to prevent the knob from malfunctioning under unexpected circumstances, the details are described as following. FIG. 5 is a schematic view of part of the components of a car safety seat of one embodiment of the invention. FIG. 6 is a schematic view of a knob in FIG. 5. In the embodiment as shown in FIG. 5 and FIG. 6, dispositions and actions of the seat body 210, the limiting portion 216, the concave arc surface S1', the knob 240, the second positioning slot 242, and the convex arc surface S2' are similar to dispositions and actions of the seat body 110, the limiting portion 116, the concave arc surface S1, the knob 140, the second positioning slot 142, and the convex arc surface S2 as shown in FIG. 4A to FIG. 4B, thus related descriptions thereof are omitted hereinafter. In addition, in order to make the drawings clearer, FIG. 5 does not show the slot structure and the safety belt, their dispositions and actions are similar to dispositions and actions of the slot structure 110a and the safety belt 120 shown in FIG. 4A to FIG. 4D, thus related descriptions thereof are omitted hereinafter.

Figure 7A:
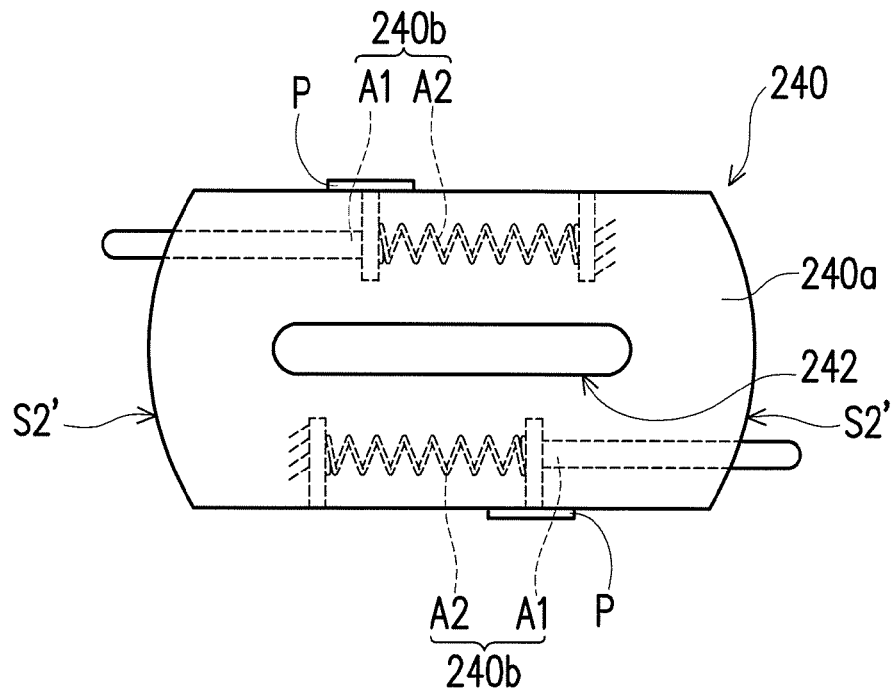
FIG. 7A and FIG. 7B depict an actuation means of an engaging latch and an elastic member in FIG. 6.
Figure 7B:
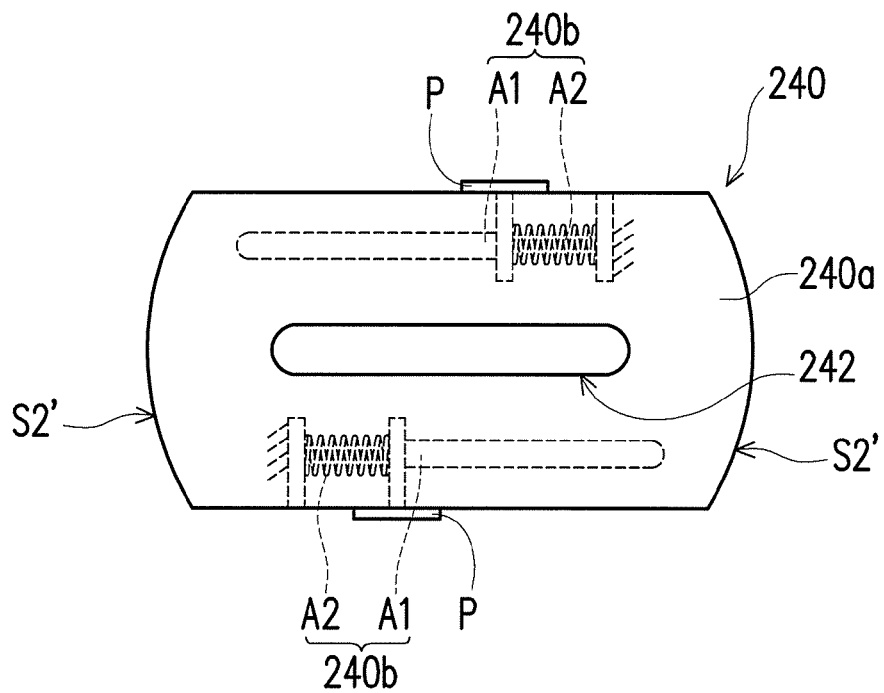

The difference between the embodiment shown in FIG. 5 and FIG. 6 and the embodiment shown in FIG. 4A to FIG. 4B is that the knob 240 includes a knob body 240a and at least one fastening structure 240b (depicted as two), the fastening structure 240b is disposed on the knob body 240a and adapted to fasten the knob body 240a to the seat body 210. More specifically, the seat body 210 has a plurality of the engaging holes H on the concave arc surface S1', the fastening structure 240b includes an engaging latch A1 and an elastic member A2. The engaging latch A1 is slidably disposed in the knob body 240a, the elastic member A2 is, for example, a compressed spring and connected between the engaging latch A1 and the knob body 240a. FIG. 7A and FIG. 7B depict an actuation means of an engaging latch and an elastic member in FIG. 6. Under the condition that the user does not apply a force on the engaging latch A1, the engaging latch A1 protrudes to outside of the knob body 240a via the elastic force of the elastic member A2 as shown in FIG. 7A and engages into the corresponding engaging hole H (depicted in FIG. 5), so as fasten the knob body 240a to the seat body 210. The user can apply a force on the push button P of the engaging latch A1, the engaging latch A1 resist the elastic force of the elastic member A2 so as to be pulled into the knob body 240a as shown in FIG. 7B and to move away from the corresponding engaging hole H (depicted in FIG. 5), so that the user can turn the knob 240. In other embodiments, the knob can be fixed by other forms of the fastening structure, the invention is not limited thereto.

In summary, in the car safety seat of the invention, the first positioning slots which are used for positioning the safety belt are connected with each other through the guiding slots, and the safety belt penetrates through the second positioning slot of the knob and the corresponding first positioning slot in sequence, so that the user can drive the safety belt to move to a different first positioning through the guiding slot by simply turning the knob and making the knob move along the slot structure. Accordingly, the user is able to adjust the position of the safety belt quickly and easily without detaching the safety belt from the seat body, so as to increase the user's intention to adjust the safety belt of the car safety seat, and further increase the usage rate of the safety belt to provide a safety environment for the child in a car ride. Furthermore, the structure of the knob is simple and lightweight to be configured at the front side of the seat body and does not need to be configured at the back side of the seat body as the conventional safety belt adjusting mechanism. Therefore, the user can easily and directly operate the knob to adjust the safety belt from the front side of the seat body, and there is no need to disassemble the whole car safety seat in order to adjust the safety belt from the back side of the seat body. In addition, the slot structure and the knob which are used to adjust the safety belt are not only disposed on the backrest but also disposed on the seating portion of the car safety seat of invention. Accordingly, the safety belt of the seating portion can also be adjusted, so that the child with bigger buttock and bigger pelvis can use the safety belt of the car safety seat comfortably.

It will be apparent to those skilled in the art that various modifications and variations can be made to the structure of the invention without detaching from the scope or spirit of the invention.

What is claimed is:

1. A car safety seat, comprising:
   a seat body, having at least one slot structure, wherein the at least one slot structure comprises:
   a plurality of first positioning slots, arranged with intervals in sequence; and a plurality of guiding slots, wherein each of the plurality of first positioning slots is connected with another adjacent one of the plurality of first positioning slots through one of the plurality of guiding slots, and each of the plurality of guiding slots extends from one of the plurality of first positioning slots to another adjacent one of the plurality of first positioning slots;

at least one knob, movably disposed on the seat body and having a second positioning slot, wherein the second positioning slot is aligned with any one of the plurality of first positioning slots; and at least one safety belt, penetrating through the second positioning slot and a corresponding first positioning slot in sequence, wherein the at least one knob is adapted to rotate to drive the at least one safety belt to enter a corresponding guiding slot, and the at least one knob is adapted to move along the at least one slot structure to drive the at least one safety belt to pass through the corresponding guiding slot to arrive another adjacent one of the plurality of first positioning slots, wherein the seat body has at least one recession, the at least one slot structure is formed inside the at least one recession, an inner wall of the at least one recession has a plurality of limiting portions, the plurality of limiting portions are respectively corresponding to the plurality of first positioning slots, the at least one knob is adapted to be limited to any one of the plurality of first positioning slots by a corresponding limiting portion, wherein the at least one knob has two convex arc surfaces opposite to each other, each of the plurality of limiting portions has two concave arc surfaces opposite to each other, the two convex arc surfaces are adapted to lean against the two concave arc surfaces respectively to prevent the at least one knob from moving along the at least one recession, the at least one knob is adapted to rotate so as to make the two convex arc surfaces move away from the two concave arc surfaces.

2. The car safety seat as recited in claim 1, wherein the at least one safety belt is positioned to the corresponding first positioning slot when the at least one knob rotates to a first state to make an extending direction of the second positioning slot parallel to an extending direction of the corresponding first positioning slot, and a part of the at least one safety belt enters the corresponding guiding slot when the at least one knob rotates to a second state to make the extending direction of the second positioning slot perpendicular to the extending direction of the corresponding first positioning slot.

3. The car safety seat as recited in claim 1, wherein the seat body comprises a seating portion and a backrest connected to each other, the seating portion is located below the backrest, the at least one slot structure is formed at the backrest.

4. The car safety seat as recited in claim 1, wherein a number of the at least one slot structure is plural, a number of the at least one knob is plural, a number of the at least one safety belt is plural, the safety belts penetrate through the slot structures and the knobs respectively.

5. The car safety seat as recited in claim 1, wherein the seat body comprises a seating portion and a backrest connected to each other, the seating portion is located below the backrest, the at least one slot structure is formed at the seating portion.

6. The car safety seat as recited in claim 1, comprising a wrap member, wherein the wrap member wraps the at least one safety belt.

7. The car safety seat as recited in claim 1, wherein the at least one knob comprises a knob body and at least one fastening structure, the at least one fastening structure is disposed on the knob body and adapted to fasten the knob body to the seat body.

8. The car safety seat as recited in claim 7, wherein the seat body has a plurality of engaging holes, the at least one fastening structure includes:
    an engaging latch, slidably disposed in the knob body; and
    an elastic member, connected between the engaging latch and the knob body, wherein the engaging latch is engaged into the engaging hole via an elastic force of the elastic member to fasten the knob body to the seat body, and the engaging latch is adapted to resist the elastic force of the elastic member and move away from the engaging hole.

* * * * *